(12) United States Patent
Roscoe et al.

(10) Patent No.: US 9,053,413 B2
(45) Date of Patent: Jun. 9, 2015

(54) AUTOMATICALLY IDENTIFYING LOCATIONS OF PRINTING DEFECTS WITHIN PRINTED ROLLS

(71) Applicant: XEROX CORPORATION, Norwalk, CT (US)

(72) Inventors: Gary W. Roscoe, Fairport, NY (US); Aldwin A. Roberts, Rochester, NY (US); Jeffrey M. Gramowski, North Chili, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/947,697

(22) Filed: Jul. 22, 2013

(65) Prior Publication Data

US 2015/0022845 A1    Jan. 22, 2015

(51) Int. Cl.
*G06K 15/00* (2006.01)
*G06K 15/02* (2006.01)
*B41J 15/16* (2006.01)

(52) U.S. Cl.
CPC .......... G06K 15/408 (2013.01); G06K 15/1822 (2013.01); B41J 15/16 (2013.01)

(58) Field of Classification Search
CPC ....... G06F 3/122; G06F 3/123; G06F 3/1286; G06F 3/1296; G06F 9/4411
USPC ............. 358/1.13, 1.15, 1.6; 347/19, 10, 218, 347/101; 400/74, 613, 621, 242
See application file for complete search history.

(56) References Cited

U.S. PATENT DOCUMENTS

| | | | |
|---|---|---|---|
| 5,608,639 A | 3/1997 | Twardowski et al. | |
| 6,373,584 B1 | 4/2002 | Barney et al. | |
| 7,201,272 B2 | 4/2007 | Silverbrook et al. | |
| 7,249,903 B2 | 7/2007 | Shaw, III | |
| 7,895,091 B2 | 2/2011 | Hegemier et al. | |
| 7,995,227 B2 | 8/2011 | Perdu | |
| 2004/0102870 A1 | 5/2004 | Andersen et al. | |
| 2006/0078167 A1 | 4/2006 | Heikkila et al. | |
| 2006/0115313 A1* | 6/2006 | Shaw, III | 400/621 |
| 2012/0320406 A1 | 12/2012 | Giannetti | |
| 2013/0008333 A1 | 1/2013 | Peter et al. | |

FOREIGN PATENT DOCUMENTS

| | | |
|---|---|---|
| EP | 0 772 145 | 2/1999 |
| WO | 9806897 | 2/1998 |

OTHER PUBLICATIONS

Esfahani, System and method for determining quality of printed matter, 19970507, EP 772145 A2.*

* cited by examiner

*Primary Examiner* — Martin Mushambo
(74) *Attorney, Agent, or Firm* — Gibb & Riley, LLC

(57) ABSTRACT

Methods and systems print markings on a web of media using a printer to produce a printed roll of media. During the printing, the printer automatically analyzes the internal printer conditions, and automatically identifies printing errors based on the internal printer conditions during the printing. Further, such methods and systems automatically record the printing errors in an error log file using a computerized device that is operatively connected to the printer and store the error log file in a network storage element within a computerized network. Also, such methods and systems transmit the error log file from the computerized device (or the network storage element) to a post-printing processing device using the computerized network after receiving a request for the error log file. The post-printing processing device unwinds the printed roll and automatically stops the unwinding process at locations of the printing errors based on the error log file.

24 Claims, 7 Drawing Sheets

AUTOMATICALLY IDENTIFYING LOCATIONS OF PRINTING DEFECTS WITHIN PRINTED ROLLS

BACKGROUND

Systems and methods herein generally relate to web printing and more particularly to systems and methods that automatically identify locations of printing defects within printed rolls.

In continuous feed or "web" printing systems, paper (or other printing media) is fed from one roll into a printer, and is output from the printer onto another roll. While such systems offer many advantages, including the ability to transport an entire roll of printed media, when printing faults occur, they cannot be easily located because they are internal to the roll of printed media. In other words, when printing errors happen, the continuous stream of good images on the web is disrupted with bad images.

Depending on the printing error, the web of paper may contain blank frames, defective image frames, partial image frames, or image frames that look good, but are defective because they are behind bad frames. All of this can make determining what frames are good and what frames are bad very difficult, especially if the web is re-rolled up and finished offline in a separate device.

Many times, handwritten notes are added to a completed printed roll to indicate the locations of the good and bad frames to allow subsequent processors to manually cut out the bad frames when the printed roll is unwound for later processing. In addition, the printed roll can be transferred onto another roll and observed (using, for example, automated imaging and comparison systems (based on a known good images)) to locate defective images. However, such systems rely on image analysis to determine if a sheet is good or not, and there can be errors in scanning the roll and this can produce false negatives or false positives. Further, such systems incur the separate time and costs associated with a separate checking step for each printed roll.

SUMMARY

Exemplary methods herein print markings on a web of media using a printer to produce a printed roll of media. During the printing, the printer automatically analyzes the internal printer conditions, and automatically identifies printing errors based on the internal printer conditions during the printing. The printing errors are identified only by the printer and are based only on sensors internal to the printer, and not other post-printing processing devices, such as optical devices.

Further, such methods automatically record the printing errors in an error log file using a computerized device that is operatively (meaning directly or indirectly) connected to the printer and store the error log file in a network storage element within a computerized network. Additionally, the printer can print machine-readable position markings on one or more frames to precisely indicate the location of the frames within the entire roll.

A post-printing processing device can automatically or manually read printed data from the printed roll of media, and the printed data identifies the error log file, allowing the post-printing processing device to make a request for the error log file. Also, such methods transmit the error log file from the computerized device (or the network storage element) to the post-printing processing device using the computerized network after receiving the request for the error log file. The post-printing processing device unwinds the printed roll and automatically stops the unwinding process at locations of the printing errors based on the error log file (potentially using the machine-readable position markings that have been printed on the frames).

Systems herein include a printer that prints markings on a web of media to produce a printed roll of media. The printer automatically analyzes internal printer conditions during the printing, and automatically identifies printing errors based on the internal printer conditions during the printing. The printing errors are identified only by the printer and are based only on sensors internal to the printer.

Such systems also include a computerized device operatively connected to the printer and to a computerized network. The computerized device automatically records the printing errors in an error log file and stores the error log file in a network storage element within the computerized network that is operatively connected to the printer and the computerized device.

Such systems also include a post-printing processing device operatively connected to the computerized network. The post-printing processing device automatically or manually reads printed data from the printed roll of media. This printed data identifies the error log file, which allows the post-printing processing device to make a request for the error log file. The computerized device (or more properly the network storage element) transmits the error log file to the post-printing processing device through the computerized network. The post-printing processing device unwinds the printed roll and automatically stops the unwinding process at locations of the printing errors based on the error log file.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, systems for identifying the location of printing errors within a completed printed roll range from handwritten notes to expensive, elaborate, and sometimes inaccurate automated image checking systems. In view of such issues, the methods and systems herein provide a frame integrity system that is useful with an offline unwinder/rewinder or an unwinder/finisher configuration. Such methods and systems automatically stop unwinding the printed roll at specific locations where printing defects occurred to allow the customer to inspect the roll and potentially remove the bad frames from the roll. The integrity system can locate special position marks on the roll (or determine the roll-length position using a simple length counter) and match such positional information with printing error location information from an error log that was created as the roll was being printed by the print engine. The error log is created based on printing conditions being outside printing processing tolerances as determined by the printer as the printing is being performed. Also, the printer operators can add annotations to the error log to essentially include "virtual sticky notes" in the error log to help those performing the post-printing processing as the printed roll is being unwound.

Figure 1:
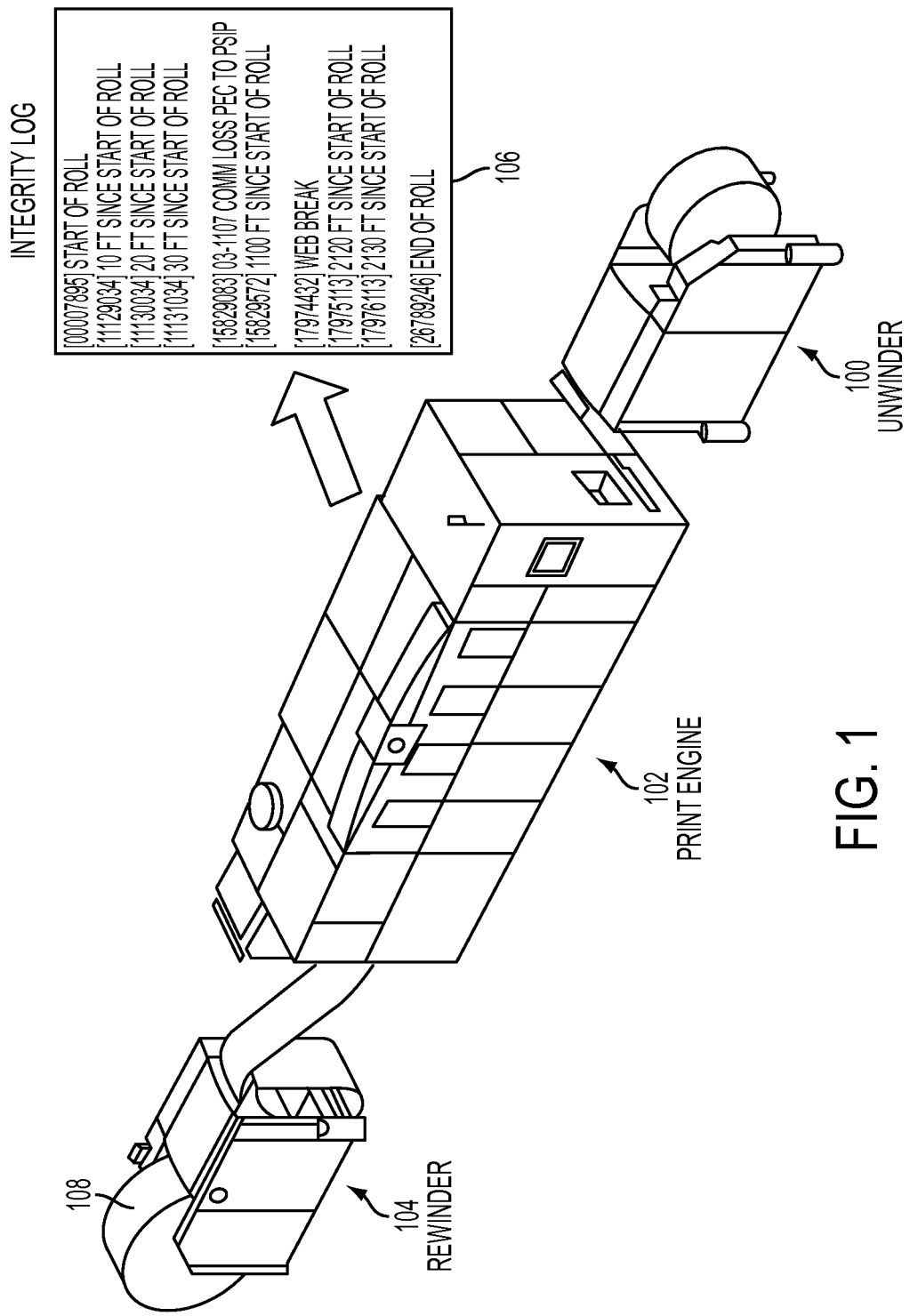
FIG. 1 is a schematic diagram illustrating devices herein.

Some examples of this are shown in the accompanying drawings. More specifically, as shown in FIG. 1, some continuous feed printing systems use an unwinder 100, a print engine 102 and a rewinder 104. The unwinder 100 unwinds a blank roll of print media (potentially containing no print markings, or only background markings) and feeds the print media into the print engine 102 to be imaged. After the print media is imaged by the print engine 102, the print media is typically re-rolled up by the rewinder 104 to from a printed roll.

Figure 2:
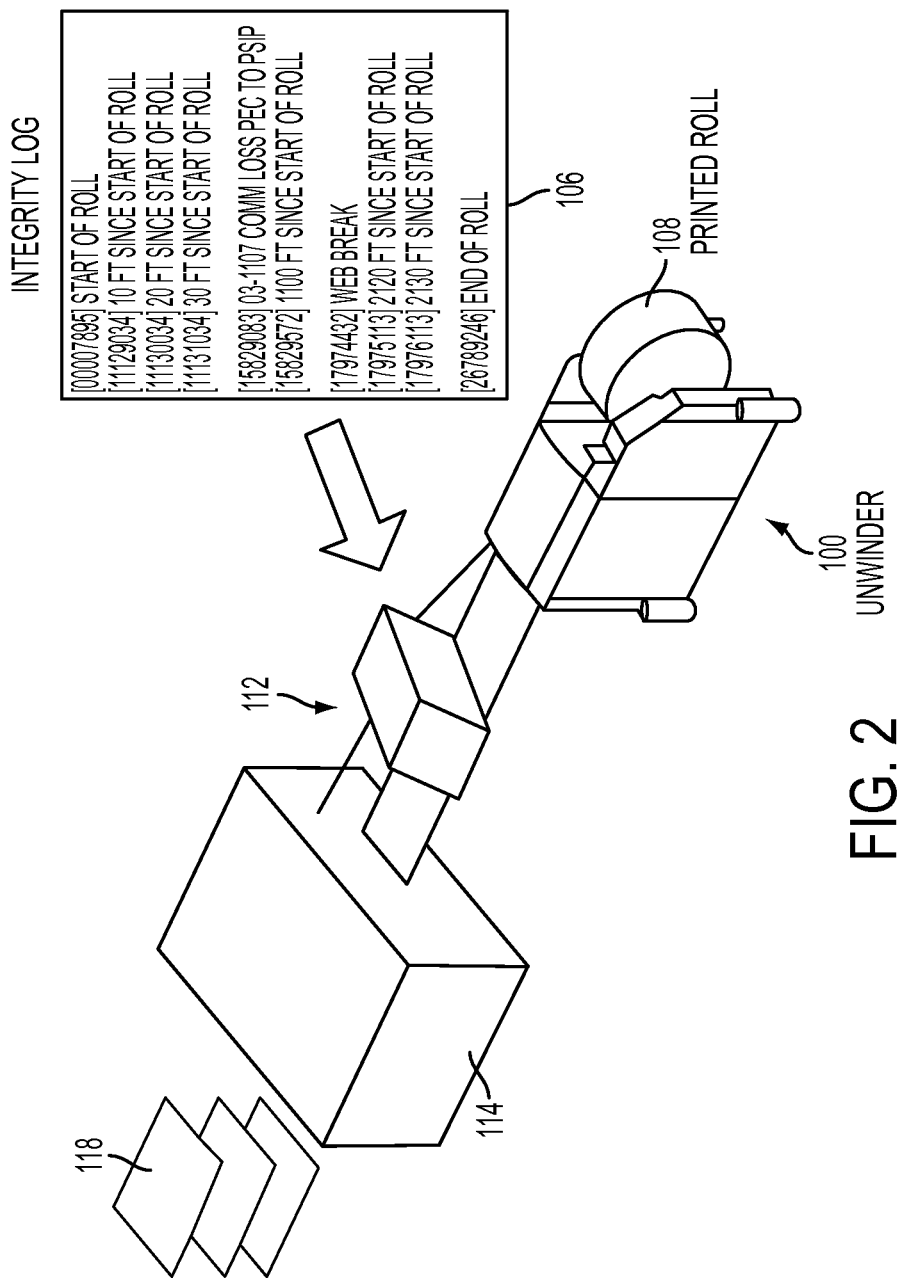
FIG. 2 is a schematic diagram illustrating devices herein.

From there the printed roll is transported to a different post-printing processing device 114, such as that shown in FIG. 2. For example, an unwinder 100 can unwind the printed roll 108 into the post printing processing device 114, which can be a rewinder 104, or can be a cutting and finishing device 114 that cuts up and finishes the printed roll 108 into finished customer jobs 118. Further, FIG. 2 illustrates an integrity system 112, which can be separate from the finishing device 114 and the unwinder 100 or can be incorporated into such devices. The integrity system 112 uses the integrity log 106 to control the unwinder 100 to automatically stop the unwinding process at locations where printing errors occurred.

Therefore, stated in general terms, the systems and methods herein detect a system event at which point the linear distance and roll information is logged into the integrity log. Special machine readable positional marks can be printed at the printing error location of the printed roll 108, and/or such positional marks can be printed periodically on the printed roll 108. Such positional marks can be printed in regions of the printed roll 108 that will be discarded after cutting (e.g., margins, kerf regions, etc.) and/or can be printed using infrared ink, microprinting, etc., so that such positional marks are not visible in the final product 118 output by the finisher 114.

The printed roll 108 is transported to the post-printing processing location and is loaded onto the post-printing processing equipment 100. The roll 108 is advanced until the "end of roll" mark is detected by the integrity detector system 112. This end of roll mark contains a computer readable code (barcode, glyph, QR code, etc.) or a human-readable code that identifies the network storage location of the integrity log 106 (the network address of the integrity log file 106 in the network server). This allows the integrity detector system 112 to accesses the network server to retrieve the integrity log 106. The integrity log 106 is then loaded into memory of the integrity system 112 to allow the finisher to automatically stop at error locations (or to automatically discard defective frames).

Once the integrity system 112 is loaded with the integrity log 106, the operator can select a desired stop point of the roll 108 (or the unwinder 100 can be controlled by the integrity system 112 to automatically advance to the first printing error) and the unwinder 100 automatically advances to this location of the roll 108. Once the unwinder 100 has advanced to the printing error, the operator can manually remove any bad frames from the roll 108, allowing the post-printing processing to continue only on properly printed frames. The integrity system 112 can use distance marks (or page or frame identification marks) printed on the printed roll 108 to determine exactly where to stop the roll 108.

Most continuous feed printers are high speed devices that operate under very heavy duty cycles and are designed to detect and quickly correct printing conditions that may cause printing errors. Such systems strive to continue printing even in the presence of printing parameters being out of tolerance limits (such systems continue to print while such printing parameters are being brought back into such tolerance limits) to keep production at high levels. Therefore, such printers self-detect printing errors, and with systems and methods herein, such self-detected printing errors are maintained in an error log 106.

Thus, during printing, significant system events that depart from standard printing conditions are captured. Some of this information is also displayed to the operator on the print engine display. Further, methods and systems herein store such information in the error log 106 so that it is available for the operator of the finisher 114 to use after the print job is completed and has been rolled up into a printed roll 108. Thus, the error log 106 contains significant system events and distance information.

Examples of various "significant system events" that can be recorded in the error log 106 include faults, status, crashes, job information, web breaks, manual web advance, other information deemed critical by the print engine, etc. As mentioned above, the operator can add annotations ("virtual sticky notes") to the error log 106 to help those performing the post-printing processing. The error log 106 can also include job recovery information. The job recovery information indicates, for example, which frames were reprinted. The error log 106 can also reference printed (page identification) marks printed on the print media that correlate to specific errors in the error log 106. Such printed page identification marks provide a unique identifier for each potentially defective frame, so the location identification of errors is very accurate. The error log 106 includes web distance measurements (either matched to linear distance (e.g., feet, meters, etc.) or matched to the machine readable positional marks) to identify the roll locations of defective pages or frames.

Figure 3:
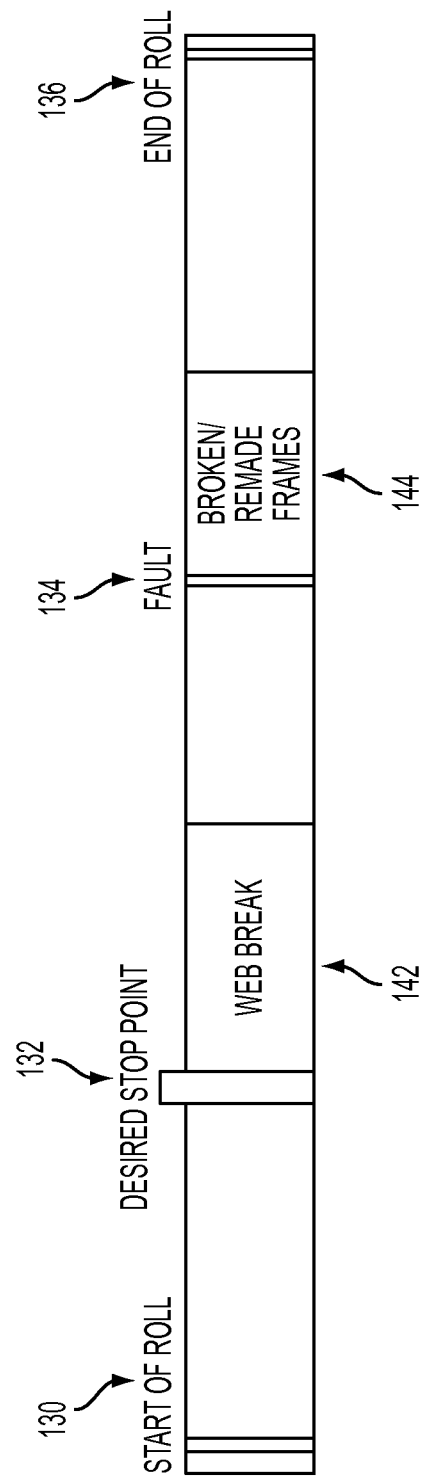
FIG. 3 is a schematic diagram illustrating a printed roll herein.

For example, as shown in FIG. 3, the distance and roll information can include a start of roll mark 130 (potentially identified by machine readable positional marks), a first stopping point 132 (potentially identified by machine readable positional marks) where a web break occurred 142, a second stopping point 134 (potentially identified by machine readable positional marks) where faulting printing occurred (and where remade (reprinted) frames are located) 144, and an end of roll mark 136 (potentially identified by machine readable positional marks).

In the error log 106, web length distance measurements are made at some periodic interval (e.g., distance since the "start of roll" mark 130 in every X frames or X feet/meters). Further, timestamps for the system events that are in units of encoder counts instead of (or in addition to) time can be used in the error log 106 to identifications in the printed roll. With the combination of machine readable positional marks and web length distance measurements, the system events in the error log 106 can be very accurately matched to a physical region of the printed roll. The error log can be of any format and contains a distance measure and a description for that distance Such error log information is used to control the post-printing system so that it will be stopped at potentially bad sections of the roll. Thus, the error log can simply contain the "ft of roll" for each system event, and this could replace periodic logging of distance entries. The error log could also use "frame ID" for locating the specific frame that the fault occurred on. "Frame ID" provides yet another way of detecting a specific place on the roll, and frame ID marks can be printed on each frame of the roll. Again, the error log can take any form and generally contains "roll information" (ft of roll, frame ID, etc . . . ) that is logged with system events (faults, cycle up, cycle down, etc . . . ) to synchronize the two.

The systems and methods herein provide the ability to use information gathered from the print engine and apply it to the post-printing processing systems. Further, the systems and methods herein allow users to add "virtual sticky notes" or annotations to the error log 106, and these notes can be re-accessed at the finisher 114. The systems and methods herein provide more information, including information produced by the printing engine itself, as opposed to the limited data available from optical scans of the printed product. This allows the post-processing operator to locate defects more easily.

Figure 4:
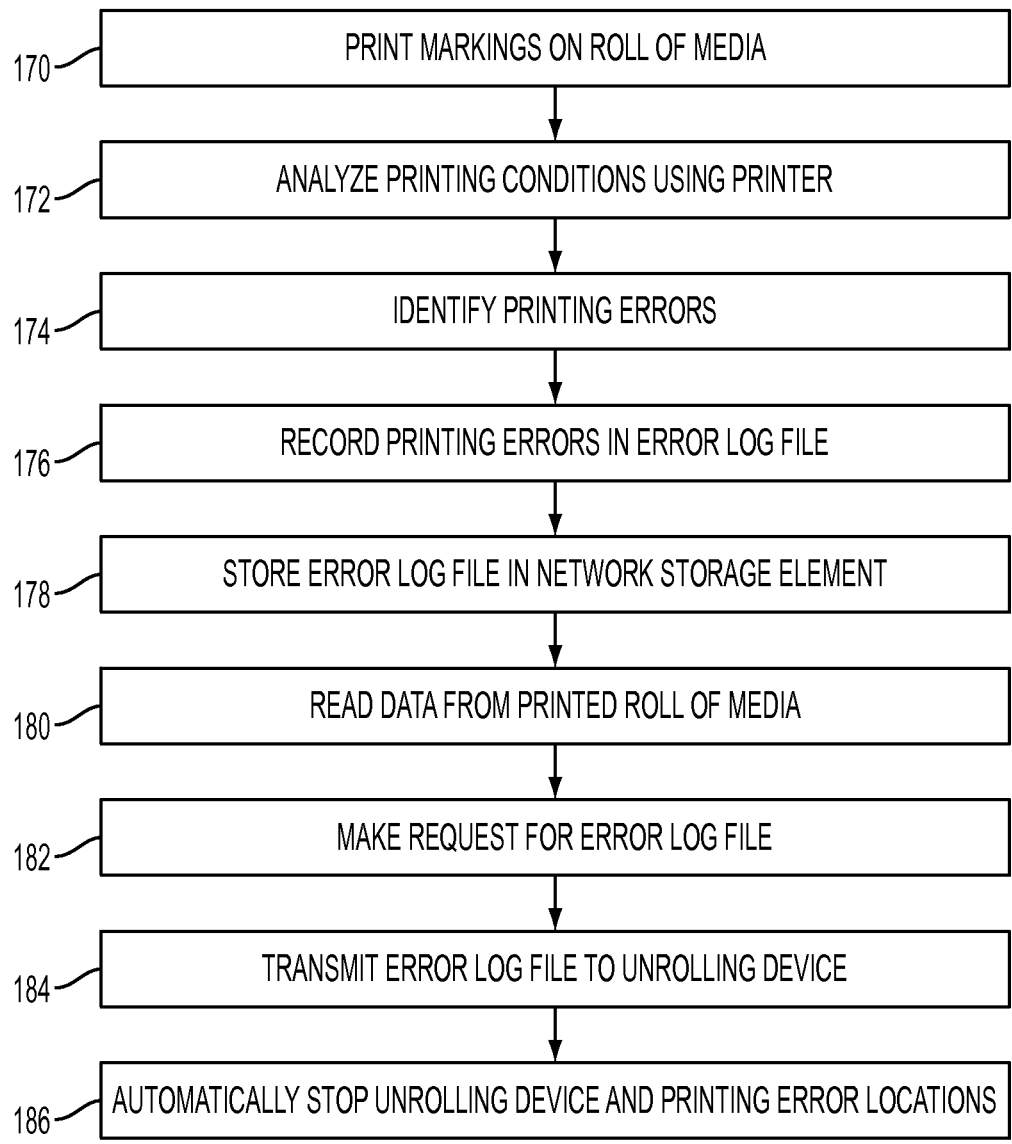
FIG. 4 is a flow diagram of various methods herein.

FIG. 4 is flowchart illustrating exemplary methods herein. In item 170, these methods print markings on a web of media using a printer to produce a printed roll of media. During the printing, in item 172 the printer automatically analyzes the internal printer conditions, and in item 174 automatically identifies printing errors based on the internal printer conditions during the printing. The printing errors are identified only by the printer and are based only on sensors internal to the printer, and not some other devices, such as optical devices.

Thus, during the printing 170, special machine readable positional marks can be printed at the printing error location of the printed roll, and/or such positional marks can be printed periodically on the printed roll. Such positional marks can be printed in regions of the printed roll that will be discarded after cutting (e.g., margins, kerf regions, etc.) and/or can be printed using infrared ink, microprinting, etc., so that such positional marks are not visible in the final product output by the finisher.

Further, in item 176, such methods automatically record the printing errors in an error log file using a computerized device that is operatively (meaning directly or indirectly) connected to the printer and, in item 178, store the error log file in a network storage element (comprising a computer-readable, tangible, non-transitory storage medium) within a computerized network. A post-printing processing device can automatically or manually read printed data from the printed roll of media in item 180, and the printed data identifies the error log file, allowing the post-printing processing device to make a request for the error log file in item 182.

Also, in item 184 such methods transmit the error log file from the computerized device (or the network storage element) to the post-printing processing device using the computerized network after receiving the request for the error log file. The post-printing processing device unwinds the printed roll and can automatically stops the unwinding process at locations of the printing errors based on the error log file in item 186.

By automatically stopping at potential printing errors in item 186, the methods and devices herein provide the post-printing device operator an opportunity to visually inspect the printing. The operator can then discard any non-acceptable portions of the printed roll. Alternatively (especially if the potentially defective frames were reprinted immediately after the defective frames) the post-printing processing device can automatically discard the potentially defective frames without any operator action or input. For example, the post-printing processing device can include a sorting device that sorts the defective frames into a discard location that is separate from the output location for the properly printed frames after such frames are cut into individual sheets, and can perform such sorting actions automatically based only on the information contained in the error log file (and the roll distance/location information).

Figure 5:
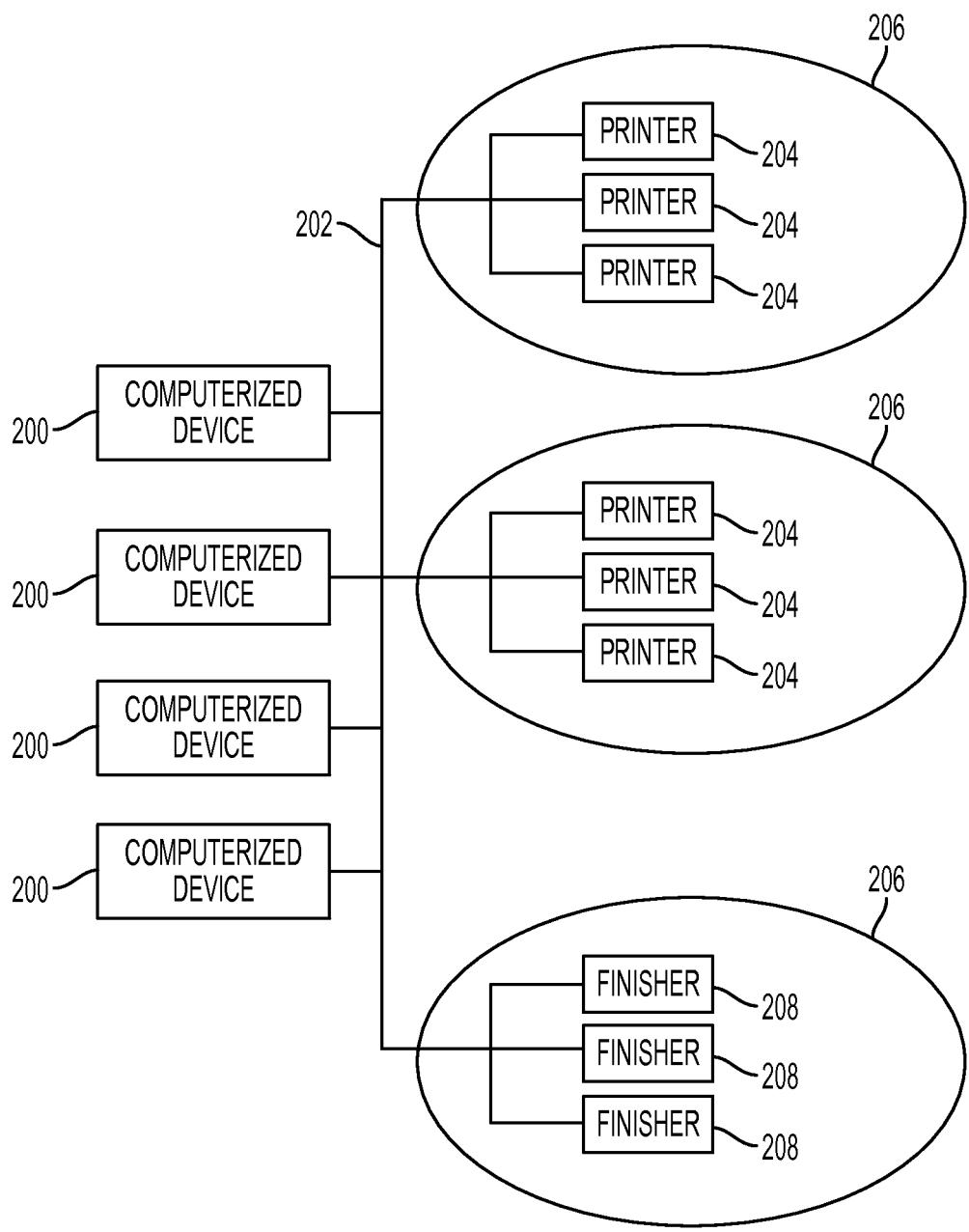
FIG. 5 is a schematic diagram illustrating systems herein.

As shown in FIG. 5, exemplary system systems and methods herein include various computerized devices 200, 204, 208 located at various different physical locations 206. The computerized devices 200, 204, 208 can include print servers, printing devices, personal computers, post-printing processing devices (finishers/unwinders) etc., and are in communication (operatively connected to one another) by way of a local or wide area (wired or wireless) network 202.

In one example, the error log file 106 can be created by one of the web printers 204 and can be uploaded through the network 202 and stored in a server 200. The error log file 106 can then be downloaded over the network 202 by one of the finishers/unwinders 208 when the finisher 208 reads the error log file 106 network storage location (200) from the machine readable code 130 positioned at the start of the roll 108. The printers' 204 automatic identification of printing errors, automatic storage of the error log file 106 in a network storage location 200, and automatic printing of the error log file 106 network storage location 200 as machine readable code 130 at the start of the roll 108 allows the printers 204 to automatically create and provide the error log file 106 to the post-printing production devices 208, without any operator involvement or action. Further, the error log file 106 network storage location 200 machine readable code 130 at the start of the roll 108 allows the post-printing production devices 208 to automatically retrieve the error log file 106 from the network storage location 200 and to automatically discard defective frames, or to automatically stop at potential print errors to allow operator action/inspection, without any operator input or action.

Figure 6:
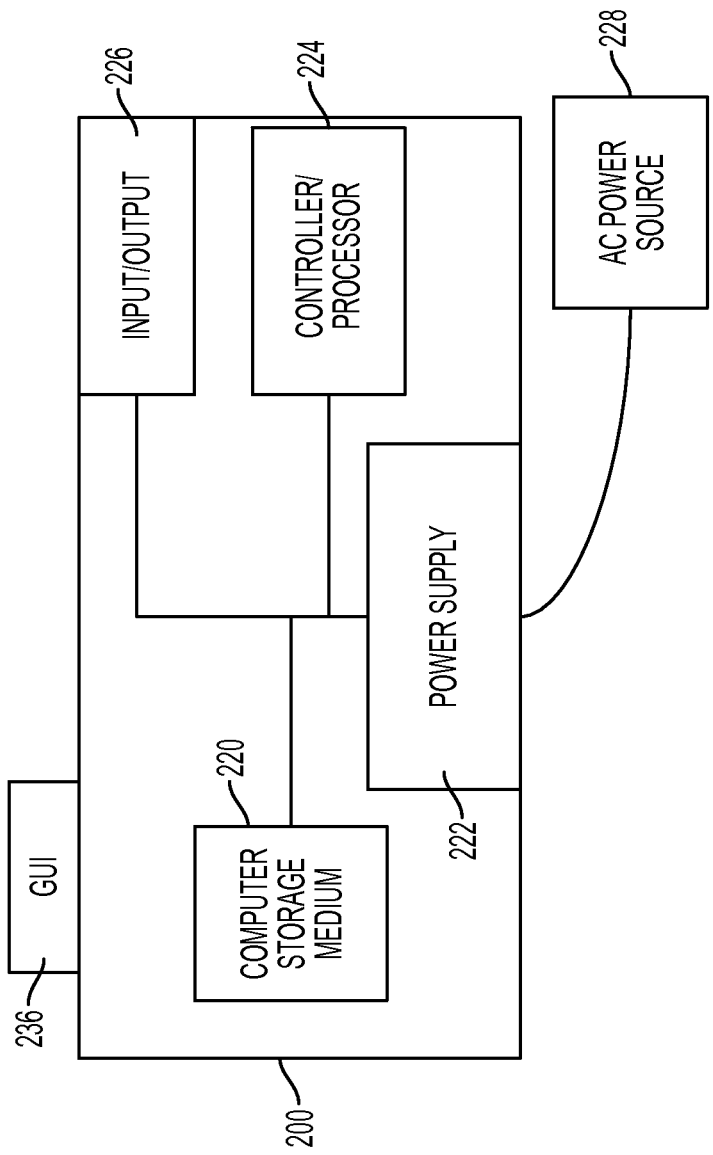
FIG. 6 is a schematic diagram illustrating devices herein.

FIG. 6 illustrates a computerized device 200, which can be used with systems and methods herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 6, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 7:
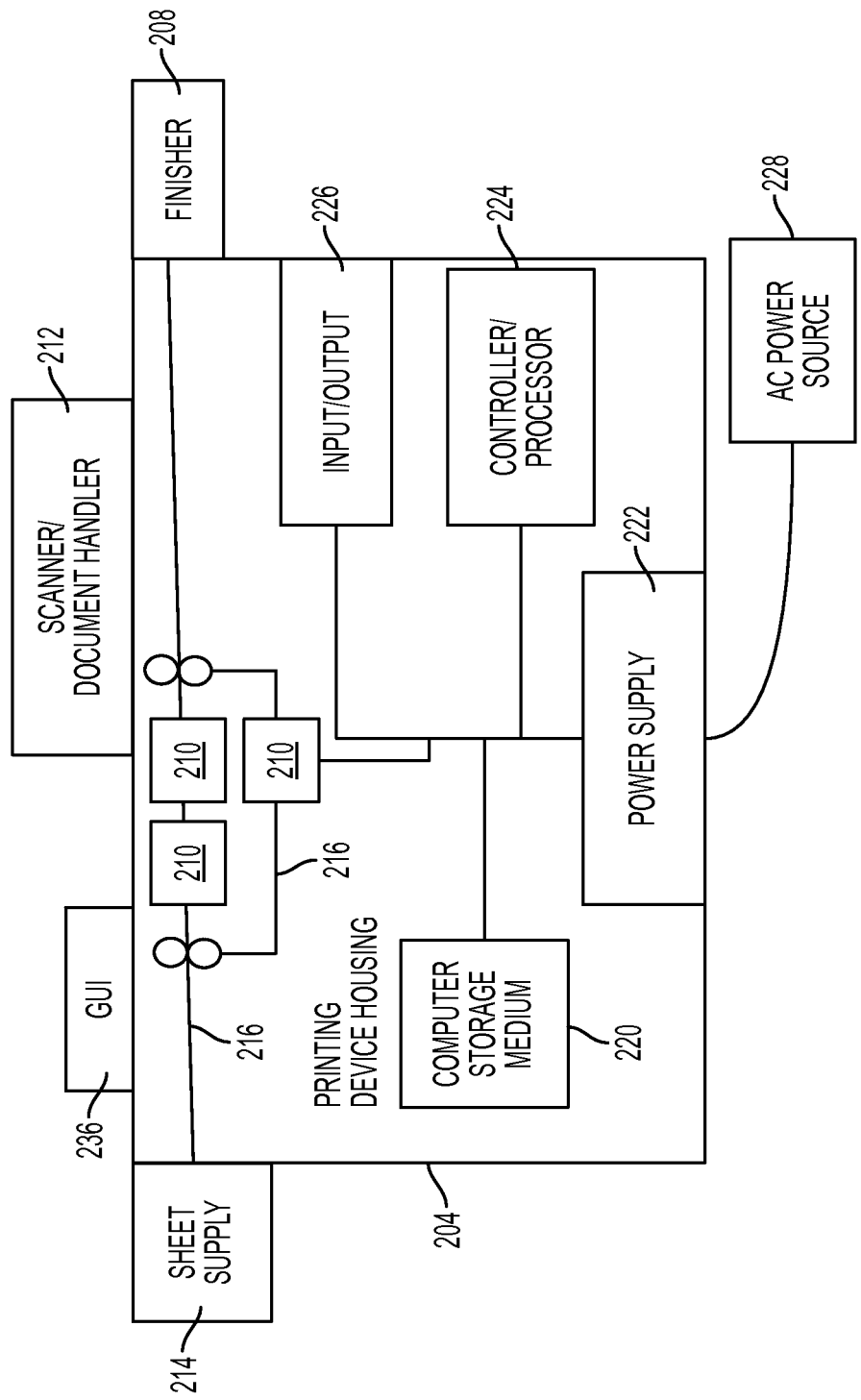
FIG. 7 is a schematic diagram illustrating devices herein.

FIG. 7 illustrates a computerized device that is a printing device 204, which can be used with systems and methods herein and can comprise, for example, a web printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A system comprising:
   a printer printing markings on a web of media to produce a printed roll of media, said printer automatically identifying printing errors during said printing;
   a computerized device operatively connected to said printer, said computerized device automatically recording said printing errors in an error log file;
   a computerized network operatively connected to said computerized device; and
   a post-printing unwinding device operatively connected to said computerized network,
   said computerized device transmitting said error log file to said post-printing unwinding device through said computerized network after said printing and after said recording said printing errors in an error log file,
   said post-printing unwinding device unwinding said printed roll, and
   said post-printing unwinding device automatically stopping said unwinding at locations of said printing errors based on said error log file.

2. The system according to claim 1, said post-printing unwinding device making a request for said error log file.

3. The system according to claim 1, further comprising a network storage element within said computerized network, said computerized device storing said error log file in said network storage element.

4. The system according to claim 3, said error log file being transmitted from said network storage element to said post-printing unwinding device.

5. The system according to claim 1, said post-printing unwinding device one of automatically and manually reading printed data from said printed roll of media, said printed data identifying said error log file.

6. The system according to claim 1, said identifying printing errors being identified only by said printer and being based only on sensors internal to said printer.

7. A system comprising:
   a printer printing markings on a web of media to produce a printed roll of media, said printer automatically analyzing internal printer conditions during said printing, and said printer automatically identifying printing errors based on said internal printer conditions during said printing;
   a computerized device operatively connected to said printer, said computerized device automatically recording said printing errors in an error log file;
   a computerized network operatively connected to said computerized device; and
   a post-printing unwinding device operatively connected to said computerized network,
   said computerized device transmitting said error log file to said post-printing unwinding device through said computerized network after said printing and after said recording said printing errors in an error log file,
   said post-printing unwinding device unwinding said printed roll, and
   said post-printing unwinding device automatically stopping said unwinding at locations of said printing errors based on said error log file.

8. The system according to claim 7, said post-printing unwinding device making a request for said error log file.

9. The system according to claim 7, further comprising a network storage element within said computerized network, said computerized device storing said error log file in said network storage element.

10. The system according to claim 9, said error log file being transmitted from said network storage element to said post-printing unwinding device.

11. The system according to claim 7, said post-printing unwinding device one of automatically and manually reading printed data from said printed roll of media, said printed data identifying said error log file.

12. The system according to claim 7, said identifying printing errors being identified only by said printer and being based only on sensors internal to said printer.

13. A method comprising:
    printing markings on a web of media using a printer to produce a printed roll of media;
    automatically identifying printing errors during said printing using said printer;
    automatically recording said printing errors in an error log file using a computerized device operatively connected to said printer;
    transmitting said error log file from said computerized device to a post-printing unwinding device using a computerized network operatively connected to said computerized device and said post-printing unwinding device after said printing and after said recording said printing errors in an error log file;
    unwinding said printed roll using said post-printing unwinding device; and
    automatically stopping said unwinding at locations of said printing errors based on said error log file using said post-printing unwinding device.

14. The method according to claim 13, further comprising making, by said post-printing unwinding device, a request for said error log file.

15. The method according to claim 13, further comprising storing, by said computerized device, said error log file in a network storage element within said computerized network.

16. The method according to claim 15, said transmitting said error log file comprising transmitting said error log file from said network storage element to said post-printing unwinding device.

17. The method according to claim 13, further comprising one of automatically and manually reading printed data from said printed roll of media using said post-printing unwinding device, said printed data identifying said error log file.

18. The method according to claim 13, said identifying printing errors being identified only by said printer and being based only on sensors internal to said printer.

19. A method comprising:
- printing markings on a web of media using a printer to produce a printed roll of media;
- automatically analyzing internal printer conditions during said printing using said printer;
- automatically identifying printing errors based on said internal printer conditions during said printing using said printer;
- automatically recording said printing errors in an error log file using a computerized device operatively connected to said printer;
- transmitting said error log file from said computerized device to a post-printing unwinding device using a computerized network operatively connected to said computerized device and said post-printing unwinding device after said printing and after said recording said printing errors in an error log file;
- unwinding said printed roll using said post-printing unwinding device; and
- automatically stopping said unwinding at locations of said printing errors based on said error log file using said post-printing unwinding device.

20. The method according to claim 19, further comprising making, by said post-printing unwinding device, a request for said error log file.

21. The method according to claim 19, further comprising storing, by said computerized device, said error log file in a network storage element within said computerized network.

22. The method according to claim 21, said transmitting said error log file comprising transmitting said error log file from said network storage element to said post-printing unwinding device.

23. The method according to claim 19, further comprising one of automatically and manually reading printed data from said printed roll of media using said post-printing unwinding device, said printed data identifying said error log file.

24. The method according to claim 19, said identifying printing errors being identified only by said printer and being based only on sensors internal to said printer.

* * * * *